(12) United States Patent
Tijssen

(10) Patent No.: US 8,458,597 B1
(45) Date of Patent: Jun. 4, 2013

(54) SYSTEMS AND METHODS THAT FACILITATE THE SHARING OF ELECTRONIC ASSETS

(75) Inventor: Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 459 days.

(21) Appl. No.: 12/700,256

(22) Filed: Feb. 4, 2010

(51) Int. Cl.
*G09G 5/00* (2006.01)

(52) U.S. Cl.
USPC .......................... 715/748; 715/769; 715/753

(58) Field of Classification Search
USPC ......................................... 715/753, 748, 769
See application file for complete search history.

(56) References Cited

U.S. PATENT DOCUMENTS

| | | | | |
|---|---|---|---|---|
| 5,068,646 A | * | 11/1991 | Baker | 345/473 |
| 5,774,673 A | * | 6/1998 | Beuk et al. | 709/236 |
| 5,797,085 A | * | 8/1998 | Beuk et al. | 455/88 |
| 5,910,797 A | * | 6/1999 | Beuk | 345/157 |
| 6,028,866 A | * | 2/2000 | Engel et al. | 370/461 |
| 6,044,397 A | * | 3/2000 | Eleftheriadis et al. | 725/139 |
| 6,782,253 B1 | * | 8/2004 | Shteyn et al. | 455/414.1 |
| 2001/0015719 A1 | * | 8/2001 | Van Ee et al. | 345/158 |
| 2002/0140625 A1 | * | 10/2002 | Kidney et al. | 345/1.1 |
| 2005/0288584 A1 | * | 12/2005 | McMorrow et al. | 600/437 |
| 2006/0173940 A1 | * | 8/2006 | Guntupalli et al. | 707/206 |
| 2007/0146819 A1 | * | 6/2007 | Kai | 358/474 |
| 2008/0263455 A1 | * | 10/2008 | Stults et al. | 715/748 |
| 2008/0305773 A1 | * | 12/2008 | Hundscheidt et al. | 455/412.1 |
| 2009/0309846 A1 | * | 12/2009 | Trachtenberg et al. | 345/173 |
| 2010/0281395 A1 | * | 11/2010 | Apted | 715/748 |

\* cited by examiner

*Primary Examiner* — Daeho Song
(74) *Attorney, Agent, or Firm* — Kilpatrick Townsend & Stockton LLP

(57) ABSTRACT

Systems and methods for sharing electronic assets. A first device can present a boundary across which an electronic asset can be passed. When user input moves an electronic asset partially across the boundary, the first device displays the electronic asset in a way that indicates that it is being shared and the first device provides information that allows the electronic asset to be displayed on a second device in a manner indicating that it is being shared. For example, a portion of the electronic asset crossing the first device boundary may not be displayed on the first device but may be displayed on the second device, for example, adjacent to a corresponding boundary. As an electronic asset is moved across the first boundary on the first device, the portion of the electronic asset passing into the boundary appears to emerge from the corresponding boundary on the second device.

20 Claims, 4 Drawing Sheets

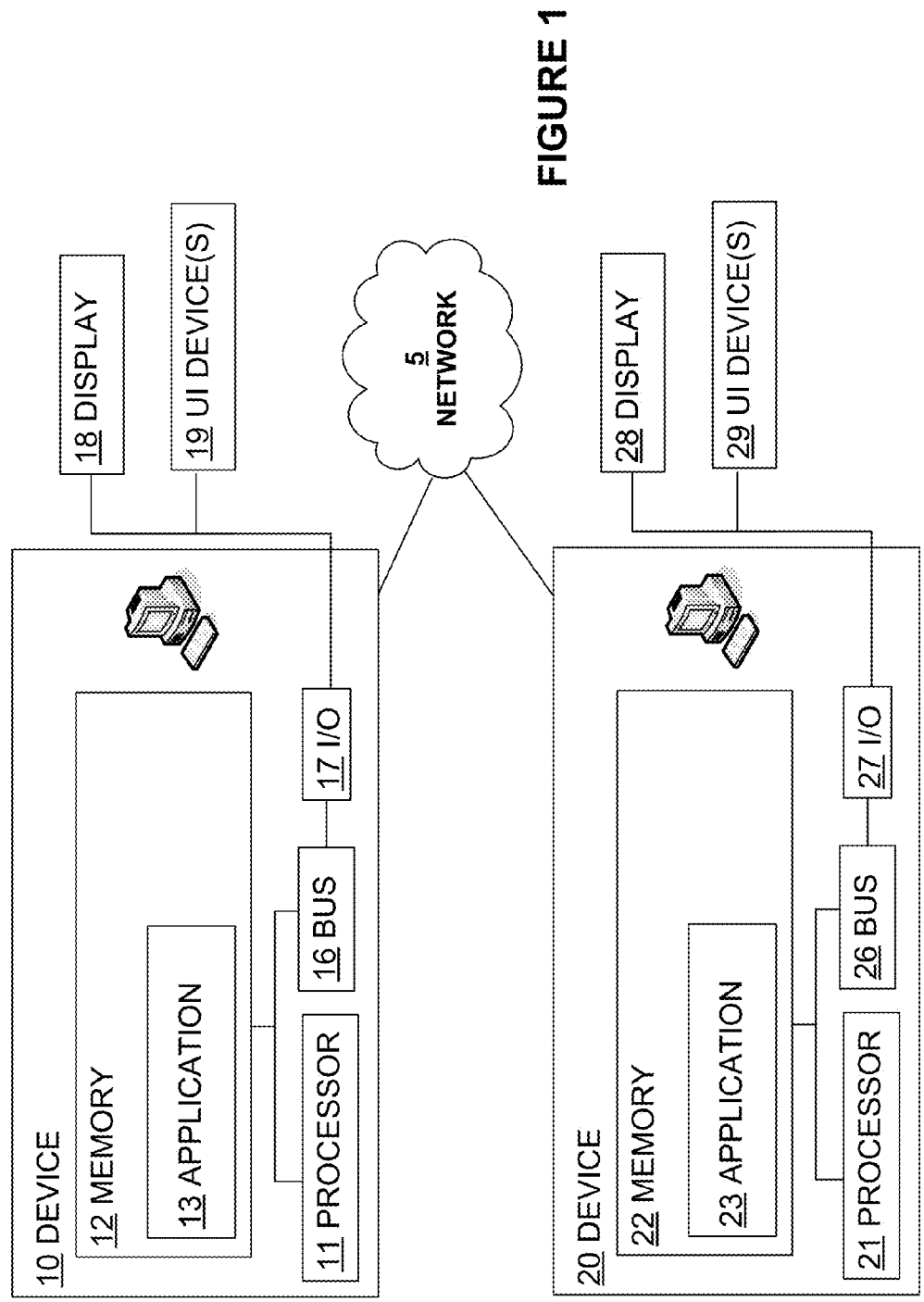

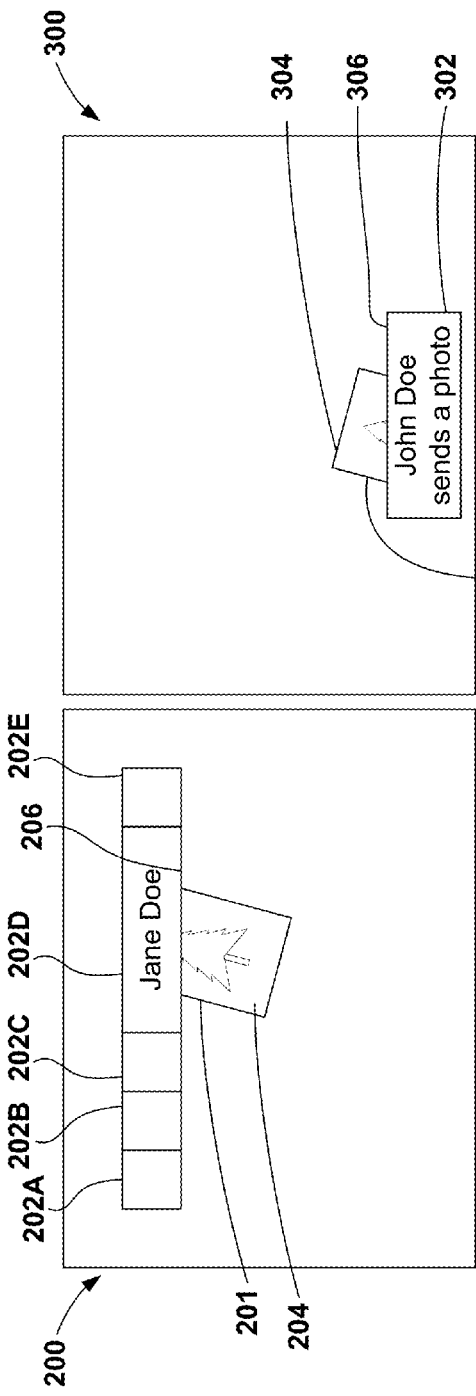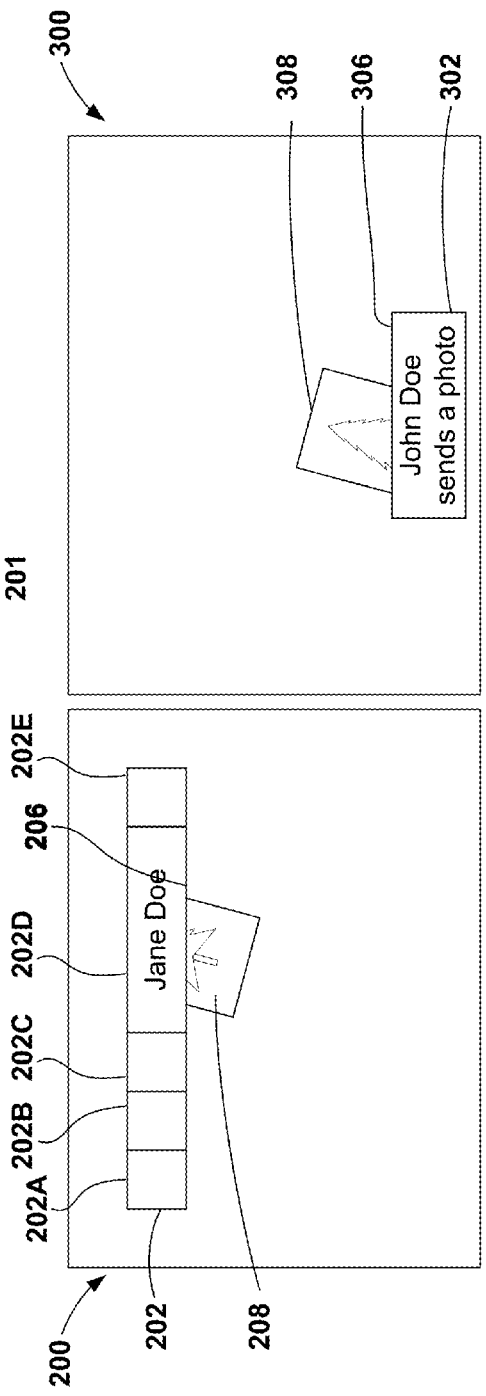

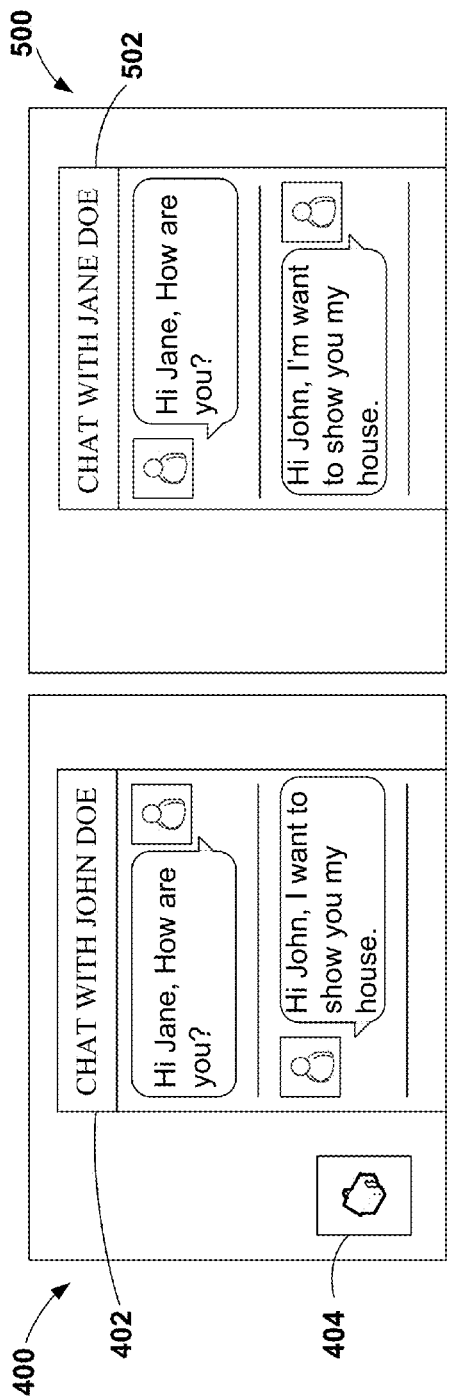
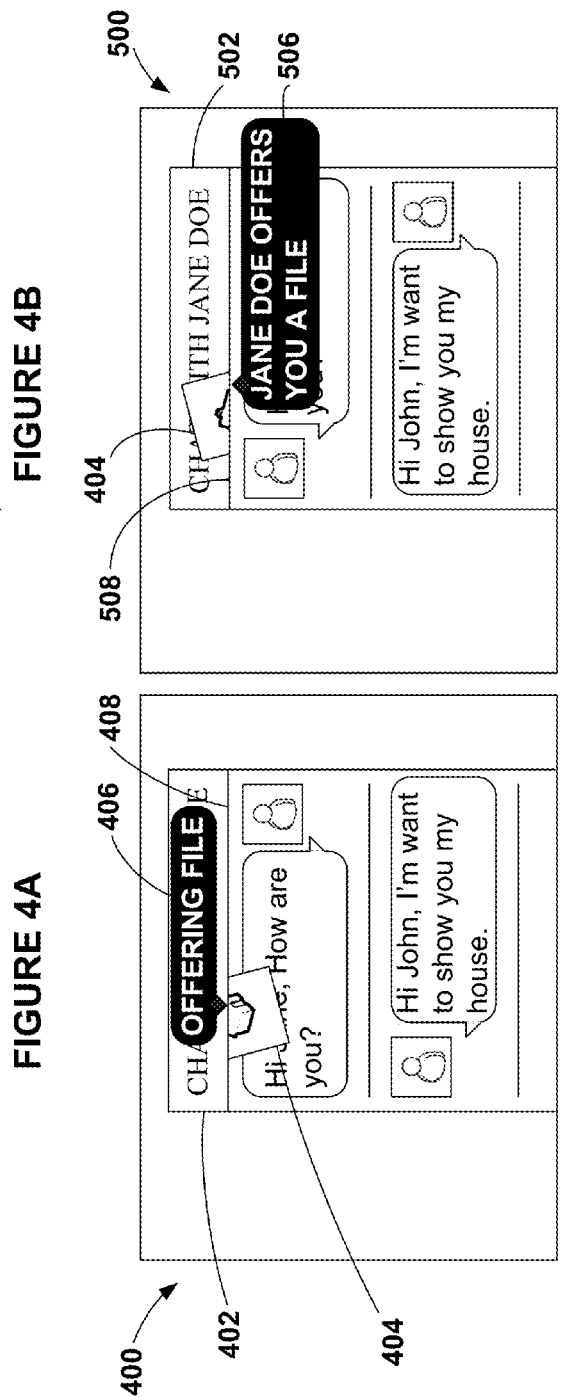
FIGURE 4A
FIGURE 4B
FIGURE 5A
FIGURE 5B

SYSTEMS AND METHODS THAT FACILITATE THE SHARING OF ELECTRONIC ASSETS

FIELD

This disclosure relates generally to computer software that runs, displays, provides, shares, or otherwise uses electronic content.

BACKGROUND

There are various ways to share electronic assets and other content amongst computers. For example, an electronic file can be transferred between computers that are part of or have access to the same network by a user on one computer attaching the electronic file to an e-mail message and sending it to another user, who can then access the e-mail and the attached file on another computer. An electronic file can also be uploaded from a first computer to a server or other site and then downloaded to a second computer.

Other types of file sending are provided by electronic messaging and computer-based telephone applications. For example, a user may chat (text or sound) with a second user on a remote device using an electronic messaging application. The messaging application may also allow the first user to send a file to the second user. Sending such a file, as a specific example, may involve the first user selecting a command to send a file and then selecting the file from a file storage directory. Generally, however, existing methods and applications that allow a user to send a file or make it available to another user are limited with respect to their visual intuitiveness and/or capabilities

SUMMARY

Exemplary methods and systems provide a first user interface presenting a boundary across which an electronic asset can be passed. When user input moves an electronic asset partially across the boundary, the first device displays the electronic asset in a way that indicates that it is being shared and the first device provides information that allows the electronic asset to be displayed on a second device in a manner indicating that it is being shared. For example, a portion of the electronic asset crossing the first device boundary may not be displayed on the first device but may be displayed on the second device, for example, adjacent to a corresponding boundary. As an electronic asset is moved across the first boundary on the first device, the portion of the electronic asset passing into the boundary appears to emerge from the corresponding boundary on the second device.

The use of corresponding sharing boundaries, displaying an electronic asset on two devices in manners that indicate sharing, and/or displaying related movements of electronic assets on two devices can facilitate the sharing of such electronic asset. For example, using such techniques a user can share and receive electronic assets using gestures that are more like real world giving and receiving gestures, e.g., pushing an electronic asset to give and pulling an electronic asset to accept it, etc.

One exemplary method of sharing an electronic asset comprises providing a user interface on a first device that allows electronic assets to be shared with a second device based on input moving the electronic assets into a displayed boundary on the first device. The method further comprises receiving input moving an electronic asset into the boundary and displaying only the portion of the electronic asset that does not cross the boundary on the first device. Information is provided from the first device that causes the user interface of a second device to display a portion of the electronic asset emerging from a corresponding boundary on the second device. The exemplary method can also involve receiving, at the first device, an acceptance, rejection, or edit for the shared electronic asset based on input associated with the portion of the electronic asset emerging from the corresponding boundary on the second device.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 1 is a block diagram depicting exemplary computing devices and a network for use in certain embodiments;

FIGS. 2A-B illustrate an electronic asset being shared across corresponding boundaries on user interfaces of two devices;

FIGS. 3A-3B illustrate the electronic asset of FIGS. 2A-2B being shared across the corresponding boundaries as the electronic asset is pushed further into the boundary on the user interface of the first device;

FIGS. 4A-4B illustrate a chat session being conducted in a chat application executing within the user interfaces of two devices;

FIGS. 5A-5B illustrate sharing an electronic asset in the context of the chat session of FIGS. 4A-4B between the user interfaces of the two devices.

DETAILED DESCRIPTION

Figure 6:
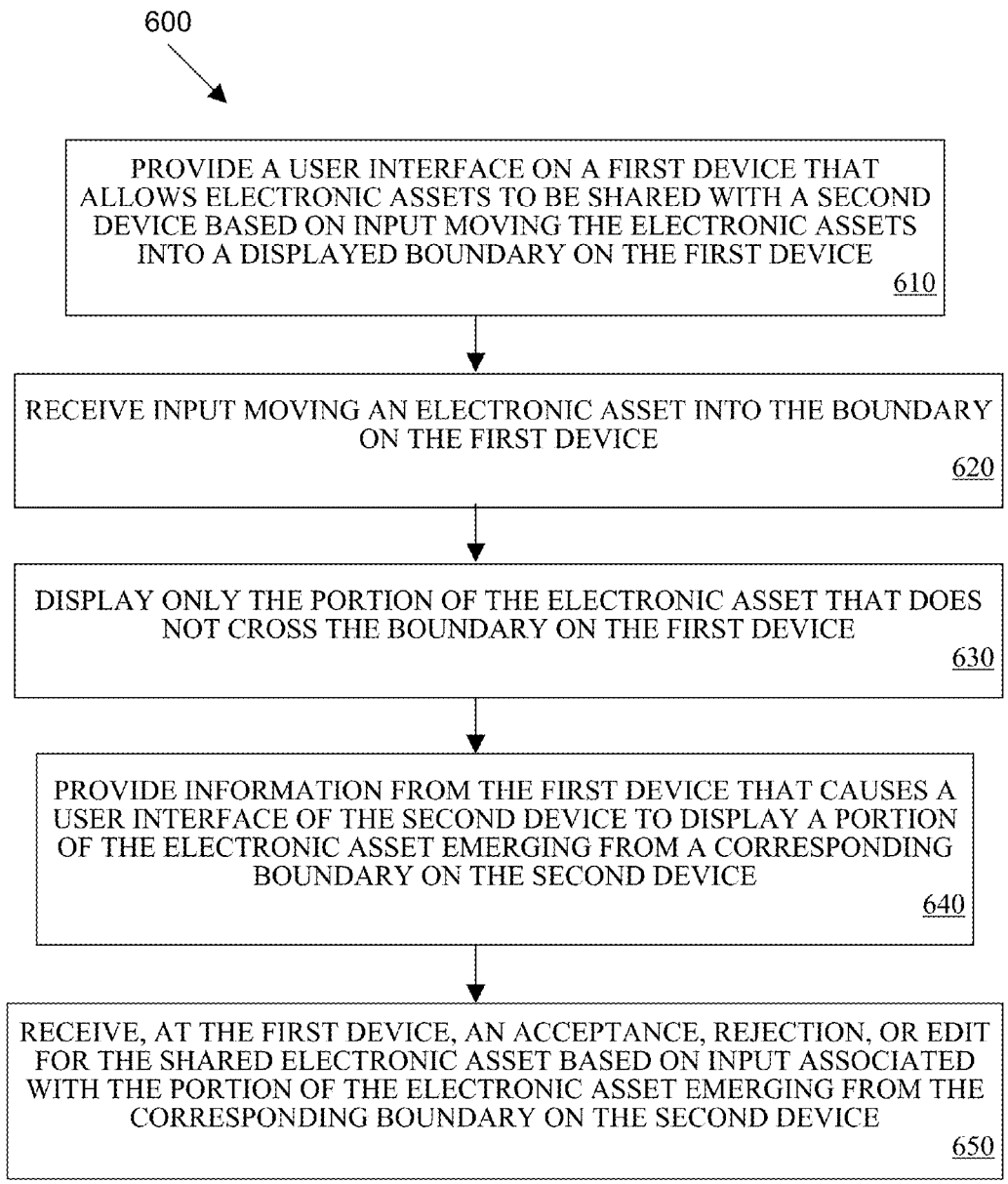
FIG. 6 is a flow chart of an exemplary method of sharing an electronic asset.

Systems and methods are disclosed to facilitate sharing of electronic assets and other content amongst computers. The methods and systems disclosed herein may be used in a variety of contexts and provide various advantages and features. To illustrate certain features and advantages the following discussion describes an embodiment in which exemplary computer interfaces allow users to share content by moving content and interacting with displayed boundaries and other features in ways that are analogous to real world sharing gestures. However, it will be understood by those of skill in this art that the methods and techniques may be used in other circumstances and may be modified and adjusted as appropriate to address the particular requirements presented by those circumstances.

In one exemplary embodiment, the user interfaces on two or more communicating devices each display GUI objects that link sharing-related user interactivity with respect to an electronic asset amongst the different devices. For example, a user can share an image with a recipient by moving the image in relation to a GUI object on that user's device. As a specific example, as the user moves the image into a boundary on that user's device, the portion of the image passing into the boundary appears to emerge from a corresponding boundary on a recipient's device. The recipient can interact with that portion to accept or reject the offered image, for example by grabbing the image and pulling it through or pushing the image back across the user's boundary.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings in which like numerals indicate like elements throughout the several Figures, FIG. 1 depicts an exemplary environment in which techniques for facilitating the sharing of electronic assets and other content amongst computers may be utilized. The methods and systems disclosed herein are also applicable on other computing systems and environments. The environment shown in FIG. 1 comprises a wired or wireless network 5 connecting various devices 10, 20. The network 5 shown comprises the Internet. In other embodiments, other networks, intranets, or combinations of networks may be used. Alternative configurations are possible.

The exemplary devices 10, 20 are respectively used as special purpose computing devices to provide specific functionality offered by their respective applications 13, 23. As is known to one of skill in the art, such applications 13, 23 may be resident in any suitable computer-readable medium and execute on any suitable processor. For example, as shown the device 10 comprises a computer-readable medium such as a memory 12 coupled to a processor 11 that executes computer-executable program instructions and/or accesses information stored in memory 12. Similarly, device 20 comprises a computer-readable medium such as a memory 22 coupled to a processor 21 that executes computer-executable program instructions and/or accesses information stored in memory 22. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A device may also comprise functionality, such as I/O features 17, 27, for connecting to a number of external or internal devices such as a mouse, a CD-ROM, DVD, a keyboard, a display, audio speakers, or other input or output devices. As examples, device 10 is shown with a display 18 and various user interface devices 19, and device 20 is shown with a display 28 and various user interface devices 29. A bus, such as bus 16 or bus 26, will typically be included in the device as well. While the devices 10, 20 may communicate with one another directly, for example, using peer-to-peer technology, communication may also be facilitated by one or more server devices (not shown).

In one exemplary embodiment, sharing is controlled by user gestures dragging graphics, icons, and other electronic assets through a defined boundary so that the shared asset shows up on another user's device. For example, part of an image that passes through a boundary is displayed for the other user. The term "boundary" is used broadly to refer to any area or object on a user interface that is associated with a corresponding area or object on another user interface for the purpose of sharing an electronic asset. A boundary can be, but need not be, a linear shape. For example, a boundary may be a circle displayed on one device such that an electronic asset dragged into the circle is displayed on the inside of a corresponding circle on another device. A boundary may provide a boundary space across which one or more objects can be simultaneously shared. For example, a user may use different parts of such a boundary space to organize multiple shared objects.

FIG. 2A and FIG. 2B illustrate an electronic asset 201 being shared across corresponding boundaries 206, 306 on user interfaces of two devices 200, 300. In this example, the sharing boundary on the first user interface is positioned intuitively with respect to various graphical representations 202A-E of remote users with whom communication and/or sharing of assets is available. Other embodiments may utilize different forms of graphical representations or present a boundary for sharing an electronic asset in another context. Thus, while this example shows various graphical representations 202A-E as squares, rectangles, and text with the names and/or pictures of several remote users, other embodiments may provide different features. Moreover, sharing functionality can be provided in various forms and presented in a variety of operating systems and electronic application interfaces.

In the example of FIGS. 2A and 2B, the user interface of the first device 200 shows an expanded icon representation 202D for the user "Jane Doe," and the bottom line of that graphic provides a boundary 206 for sharing electronic assets with the remotely-located user "Jane Doe." FIG. 2A shows the interface of the first device 200 after the user (John Doe) has moved the electronic asset 201 into the boundary 206. FIG. 2B shows the electronic asset 201 emerging from a corresponding boundary 306 on the user interface of the second device 300.

In this example, appearance of the electronic asset 201 provides a visual indication that the electronic asset is being shared since only the portion 204 of the electronic asset 201 that has not crossed the boundary 206 is visible. In other embodiments, the appearance of the electronic asset 201 can change in another or an additional way to indicate that the electronic asset is being shared. As one example, the portion of the electronic asset 201 that passes the sharing boundary 206 could be highlighted or otherwise displayed as different than the portion 204 that has not yet passed over the boundary 206. As another example, the electronic asset 201 could shrink or grow in size as it is pushed further and further across the boundary 206, until it appears very small or very large, or disappears completely.

FIG. 2B illustrates the electronic asset 201 emerging from a corresponding boundary 306 on the user interface of the second device 300. Only a portion 304 of the electronic asset is visible. In this example, the electronic asset 201 is shown emerging from a graphic 302 that presents a graphic 302 with a message identifying the source of the electronic asset 201 being shared with the text "John Doe sends a photo." Such a graphic 302 could appear when the sharing of asset 201 is initiated.

In other embodiments, the user interface of the second device may include alternative graphical representations or other contexts in which a boundary is provided. For example, either of the user interfaces of the two devices 200, 300 could provide a boundary that corresponds with a portion of (or an entire) side edge of the application providing the feature or side edge of the electronic device display itself.

FIG. 3A and FIG. 3B illustrate the electronic asset 201 of FIGS. 2A and 2B being shared across the corresponding boundaries 206, 306 as the electronic asset is pushed further into the boundary 206 on the user interface of the first device 200. A smaller portion 208 of the electronic asset 201 is displayed on the user interface of the first device 200 since the rest of the electronic asset 201 has been pushed across the boundary 206. Similarly, on the user interface of the second device 300, a larger portion 308 of the electronic asset is displayed.

In the examples of FIGS. 2A, 2B, 3A, and 3B, the electronic asset 201 being shared is a photo which is actually displayed and moved on the user interfaces of the two devices 200, 300. Such a photo may correspond to information stored in an electronic file. For example, such a photo may be displayed in its entirety, moved, and shared on a user interface. Other assets, may only be partially displayed. For example, an icon or small image may be displayed, moved, and shared, instead of the full version of a photo or video. Similarly, if the electronic asset being shared is an application, an icon may provide a small graphical representation of the application, its name, etc. More generally, if the electronic asset is a file, any form of icon or other graphical representation for the file may be displayed, moved, and shared.

The sharing of an electronic asset can involve various types of sharing. For example, sharing a photo may involve sending the entire photo file to the other user for the other user to accept or reject. Alternatively, the sharing of a photo could involve sending only a portion or all of the photo or a smaller icon or version of the photo and, upon acceptance of the sharing, the rest or larger version of the photo can be provided.

A user interface can facilitate sharing by allowing a recipient to interact with a portion of an image that is being offered. For example, as John Doe pushes the electronic asset 201 across the boundary 206, the intended recipient, Jane Doe, could grab the portion of the electronic asset and "pull" the electronic asset 201 all the way out of the corresponding boundary 306. As a specific example, Jane Doe might click on portion 304 in FIG. 2B and move the electronic asset 201 up until the entire electronic asset 201 has emerged from the boundary 306. Such a "pull" or other user interaction can be recognized by the user interface of the second device 300 as an acceptance of the photo.

Similarly, as John Doe pushes the electronic asset 201 across the boundary 206, the intended recipient, Jane Doe, could grab the portion that is emerging and "push" it back. As a specific example, Jane Doe might click on portion 304 in FIG. 2B and move the electronic asset 201 down so that the portion 304 disappears into the boundary 306. Such a "push" or other user interaction can be recognized by the user interface of the second device 300 as a rejection of the photo.

Using a corresponding boundary for sharing electronic assets can also facilitate shared interactions. For example, a recipient with whom the electronic asset is being shared may add to, delete from, or otherwise alter an electronic asset that is being shared. As a specific example, as John Doe pushes the electronic asset 201 across the boundary 206 of FIG. 2A, the intended recipient, Jane Doe, could edit the portion that is emerging to add text that says "HAPPY HOLIDAYS!" and "push" the electronic asset 201 back as described above. Such editing and "pushing" or other user interactions can be recognized by the user interface of the second device 300 as the user returning or offering for sharing an edited version of the photo.

In one embodiment, an asset is pushed back and forth with respect to a boundary so that two or more different users are all able to edit the same shared electronic asset, each such user able to edit a portion of the asset that is displayed on that user's computer at a given time. Ultimately, the final version of the electronic asset can be saved on one or more of the devices involved. Sharing of electronic assets according to the various techniques presented herein can also facilitate enhanced and different collaborative efforts, as will be understood to one of skill in this technical art.

FIG. 4A and FIG. 4B illustrate a chat session being conducted in a chat application 402, 502 executing within the user interfaces of two devices 400, 500. In this exemplary chat session the user (Jane Doe) of the user interface of the first device uses the chat application 402 to chat with John Doe and on the other end of the chat session the user (John doe) of the user interface of the second device 500 uses the chat application 502 to chat with Jane Doe. In this example, the chat session involves John Doe sending a message that reads "Hi Jane, How are you?" and Jane Doe responding with the message "Hi John, I want to show you my house." The user interface of the first device 400, that Jane Doe is using, also displays an electronic asset 404, which is an icon for a file that includes a video of Jane's house.

FIG. 5A and FIG. 5B illustrate sharing an electronic asset 404 in the context of the chat application 402, 502 used to provide a chat session between the user interfaces of the two devices 400, 500. FIG. 5A shows the interface of the first device 400 after the user (Jane Doe) has moved the electronic asset 501 into the boundary 408. An "OFFERING FILE" popup message 406 is displayed to inform the user (Jane Doe) that the movement of the electronic asset 404 across the file has caused the electronic asset 404 to be offered to the other chat session participant. FIG. 5B shows the electronic asset 404 emerging from a corresponding boundary 508 on the user interface of the second device 500. A popup message 506 informs the user, John Doe, that "JANE DOE OFFERS YOU A FILE." In some embodiments, John Doe can accept, reject, edit, or otherwise interact with the electronic asset 404 that is being shared in the various ways described herein and in other ways that will be apparent to a person of skill in this technical art.

In addition to the chat session context, sharing an electronic asset may be provided in a variety of other contexts including, but not limited to, a desktop or laptop computing device sharing an asset with another device, a mobile phone or phones sharing an electronic asset during a phone call, a mobile device sharing an electronic asset when connected to another device via a text, chat, video conferencing, screen sharing, or through any other connection application or connection type, and a television device sharing such content with a television or other electronic device.

Certain embodiments allow electronic asset movement on one device to correspond to movement of the electronic asset on one or more other user's devices. For example, as a first user pushes an electronic asset across a sharing boundary, a second user (at roughly the same time) will see a portion of the asset emerging from the corresponding boundary on the second device. Such synchronization or near synchronization can be facilitated by reducing network latency between the computing devices. Accordingly, some, but not all, embodiments can utilize technology that provides reduced latency, such as peer-to-peer technology. Other embodiments will connect to one another and share electronic assets through other techniques, including using intermediate servers and other devices.

FIG. 6 is a flow chart of an exemplary method 600 of sharing an electronic asset. The exemplary method 600 comprises providing a user interface on a first device that allows electronic assets to be shared with a second device based on input moving the electronic assets into a boundary on the first device, as shown in block 610. Such a user interface, for example, may be provided by application 13 on device 10 of FIG. 1 and provide capabilities for sharing an electronic asset with other electronic devices such as device 20.

The exemplary method 600 further comprises receiving input moving an electronic asset into the boundary on the user interface of the first device, as shown in block 620. An example of such input is input received when a user selects an icon and drags the icon partially or entirely into the boundary. The boundary itself may be displayed or not and may correspond to an edge of another graphical element, such as a representation of a user using the device with which the boundary shares content. As another exemplary alternative, the boundary may be located at some or all of one or more edges of the first devices display. It should be noted that in certain embodiments a boundary is provided within a particular application user interface and an electronic asset is moved, e.g., dragged, from outside of that application, into the application, and into the boundary. In various embodiments, the electronic asset can be a graphic, an image, an icon, a file, a video, and/or various other types of electronic content. Moving an electronic asset may involve moving an icon of the electronic asset. For example, an icon of an electronic file may be moved partially across the boundary to offer the file to be shared.

The exemplary method 600 further comprises displaying a first portion of the electronic asset on the first device, wherein the first portion is a part of the electronic asset that does not cross the boundary on the first device, as shown in block 630. This and other changes to the appearance of the graphical asset can provide a visual indication that the asset is being shared with another device. In the circumstance of a boundary associated with a graphic that is associated with another device (i.e., a boundary on an image of another user who is using the recipient device), moving the electronic asset into the boundary and not displaying the portion that crosses that boundary can provide an appearance or impression that the file is being pushed to that other user.

The exemplary method 600 further comprises providing information from the first device that allows the user interface of a second device to display a second portion of the electronic asset emerging from a corresponding boundary on the second device, as shown in block 640. When positioned to cross the boundary on the first device, the electronic asset may have a portion displayed on the first device and a second, different portion displayed on a second device.

Each of the first and second devices may allow the respective users to interact with the respective portion of electronic asset to edit or move the electronic asset. For example, based on receiving additional input for a movement of the electronic asset with respect to the boundary on the user interface of the first device, the first device may display a change to the first portion of the electronic asset, and provide additional information that allows the user interface of the second device to display a movement of the second portion such that the electronic asset appears to move on the user interface of the second device in a manner corresponding to the movement of the electronic asset on the user interface of the first device.

Information can be communicated between the first device and the second device in a variety of ways. For example, the user interface of the first device and the user interface of the second device may both be associated with applications providing a text-based chat session, a phone call, or a video conferencing connection between the first device and the second device. Information may be communicated between the first device and the second device via a connection with sufficiently low latency such that movements of the first portion and movements of the second portion are approximately synchronized, i.e., when one user moves his or her respective portion, the other user sees his or her respective portion moving. As a more specific example, if the first user pushes the electronic asset further into the boundary the first user may see his or her portion of the electronic asset decrease in size while the second user sees another portion emerging from the corresponding boundary increasing in size. One example of a low-latency connection is a peer-to-peer connection used between the first device and the second device. Another example is a low latency connection between the first device and a server and a second low latency connection between the server and the second device. Other types of connections may also be used.

The method 600 further comprises receiving, at the first device, an acceptance, rejection, or edit for the electronic asset based on second device input associated with the second portion of the electronic asset emerging from the corresponding boundary on the second device.

In some embodiments, sharing of multiple electronic assets can overlap. For example, in the context of exemplary method 600, the method could further involve receiving input moving multiple electronic assets into the boundary on the user interface of the first device and providing information from the first device that allows the user interface of a second device to display a portion of the multiple electronic assets emerging together from the corresponding boundary on the second device.

In addition, the respective applications or other user interfaces implementing an electronic asset sharing feature may provide various user-controlled or otherwise customizable features. For example, a sharing application may accept user input to change the size, position, or shape of the boundary that is used to share electronic assets. A user may also be able to set various privacy settings and/or settings related to the acceptance or rejection of electronic assets, e.g., to accept or reject all electronic assets shared by a particular user or from a particular location. A user may also be able to make selections with respect to grouping multiple shared objects, e.g., whether such objects will be aligned horizontally, sized based on time shared, etc.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing a user interface on a first device that allows electronic assets to be shared with a second device based on input moving the electronic assets into a boundary on the first device;
receiving input moving an electronic asset into the boundary on the user interface of the first device;
displaying a first portion of the electronic asset on the first device, wherein the first portion is a part of the electronic asset that does not cross the boundary on the first device;
providing information from the first device that allows the user interface of a second device to display a second portion of the electronic asset emerging from a corresponding boundary on the second device; and
receiving, at the first device, an edit, an acceptance, or a rejection of the electronic asset based on second device input associated with the second portion of the electronic asset emerging from the corresponding boundary on the second device.

2. The method of claim 1 further comprising, based on receiving additional input for a movement of the electronic asset with respect to the boundary on the user interface of the first device:
displaying a change to the first portion of the electronic asset; and
providing additional information from the first device that allows the user interface of the second device to display a movement of the second portion such that the electronic asset appears to move on the user interface of the second device in a manner corresponding to the movement of the electronic asset on the user interface of the first device.

3. The method of claim 2 wherein the additional information is provided from the first device to the second device via a connection with sufficiently low latency such that the movement of the first portion and the movement of the second portion are approximately synchronized.

4. The method of claim 3 wherein the connection is a peer-to-peer connection between the first device and the second device.

5. The method of claim 3 wherein the connection comprises a low latency connection between the first device and a server and a second low latency connection between the server and the second device.

6. The method of claim 1 further comprising receiving, at the first device, an edit for the electronic asset based on second device input associated with the second portion of the electronic asset emerging from the corresponding boundary on the second device.

7. The method of claim 1 further comprising receiving, at the first device, an acceptance of the electronic asset based on second device input associated with the second portion of the electronic asset emerging from the corresponding boundary on the second device.

8. The method of claim 1 further comprising receiving, at the first device, a rejection of the electronic asset based on second device input associated with the second portion of the electronic asset emerging from the corresponding boundary on the second device.

9. The method of claim 1 wherein the first device is a mobile device.

10. The method of claim 1 wherein the user interface of the first device and the user interface of the second device are associated with applications providing a text-based chat session, a phone call, or a video conferencing connection between the first device and the second device.

11. The method of claim 1 further comprising:
receiving input moving multiple electronic assets into the boundary on the user interface of the first device; and
providing information from the first device that allows the user interface of a second device to display portions of the multiple electronic assets emerging together from the corresponding boundary on the second device.

12. The method of claim 1 further comprising receiving input to change the size of the boundary on the first device.

13. A system comprising:
a first device comprising a processor configured to execute instruction to provide a first user interface that allows electronic assets to be shared based on input moving the electronic assets into a boundary, wherein upon receiving input moving an electronic asset into the boundary, the first device displays a first portion of the electronic asset that is a part of the electronic asset that does not cross the boundary on the first device and provides information to a second device; and
a second device comprising a processor configured to execute instruction to:
provide a second user interface and receiving receive electronic assets shared from other devices;
interpret the information received from the first device to display a second portion of the electronic asset emerging from a corresponding boundary; and
provide an edit, an acceptance, or a resection of the electronic asset to the first device based on input associated with the second portion of the electronic asset emerging from the corresponding boundary on the second device.

14. The system of claim 13 further comprising a connection for providing the information from the first device to the second device, the connection having sufficiently low latency such that movement of the first portion and movement of the second portion are approximately synchronized.

15. The system of claim 14 wherein the connection is a peer-to-peer connection between the first device and the second device.

16. The system of claim 13 wherein the second device is configured to:
receive an edit, acceptance, or rejection for the electronic asset based input associated with the second portion of the electronic asset emerging from the corresponding boundary on the second device; and
send the edit, acceptance, or rejection to the first device.

17. The system of claim 13 wherein the first user interface and second user interface are associated with applications providing a text-based chat session, a phone call, or a video conferencing connection between the first device and the second device.

18. A non-transitory computer-readable medium on which is encoded program code, the program code comprising:
program code for providing a user interface on a first device that allows electronic assets to be shared with a second device based on input moving the electronic assets into a boundary on the first device;
program code for receiving input moving an electronic asset into the boundary on the user interface of the first device;
program code for displaying a first portion of the electronic asset on the first device, wherein the first portion is a part of the electronic asset that does not cross the boundary on the first device; and
program code for providing information from the first device that allows the user interface of a second device to display a second portion of the electronic asset emerging from a corresponding boundary on the second device; and
program code for receiving, at the first device, an edit, an acceptance, or a rejection of the electronic asset based on second device input associated with the second portion of the electronic asset emerging from the corresponding boundary on the second device.

19. The computer-readable medium of claim 18 wherein, based on receiving additional input for a movement of the electronic asset with respect to the boundary on the user interface of the first device:
program code is executed to display a change to the first portion of the electronic asset; and
program code is executed to provide additional information from the first device that allows the user interface of the second device to display a movement of the second portion such that the electronic asset appears to move on the user interface of the second device in a manner corresponding to the movement of the electronic asset on the user interface of the first device.

20. The computer-readable medium of claim 19 wherein the additional information is provided from the first device to the second device via a connection with sufficiently low latency such that the movement of the first portion and the movement of the second portion are approximately synchronized.

* * * * *